United Stat[es Patent] [19]
Nicholson et al.

[11] 3,844,650
[45] Oct. 29, 1974

[54] PROJECTOR

[75] Inventors: Geoffrey C. Nicholson, Woodbury; John E. Collins, Saint Paul, both of Minn.

[73] Assignee: Minnesota Mining and Manufacturing Company, St. Paul, Minn.

[22] Filed: May 22, 1972

[21] Appl. No.: 255,616

[52] U.S. Cl................. 353/122, 353/23, 353/25, 353/44, 353/120, 350/160 LC
[51] Int. Cl................. G03b 21/00, G03b 23/00
[58] Field of Search......... 353/98; 350/160 LC, 117

[56] References Cited
UNITED STATES PATENTS

| | | | |
|---|---|---|---|
| 3,482,911 | 12/1969 | Noble | 353/98 |
| 3,652,148 | 5/1969 | Wysocki | 350/160 LC |
| 3,674,338 | 7/1972 | Gantwell | 350/117 |
| 3,732,429 | 5/1973 | Braumstein | 350/160 LC |

*Primary Examiner*—Louis R. Prince
*Assistant Examiner*—A. J. Mirabito
*Attorney, Agent, or Firm*—Alexander, Sell, Steldt & DeLaHunt

[57] ABSTRACT

A device for projecting a modulated light beam on a viewing screen, wherein modulation is achieved by electronic actuation of an electro-optical assembly utilizing a thin liquid crystal layer.

6 Claims, 6 Drawing Figures

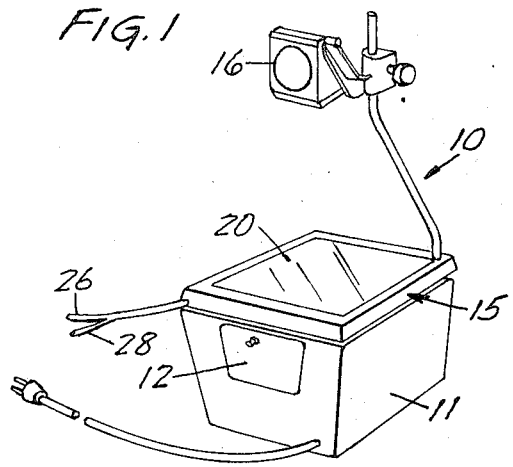
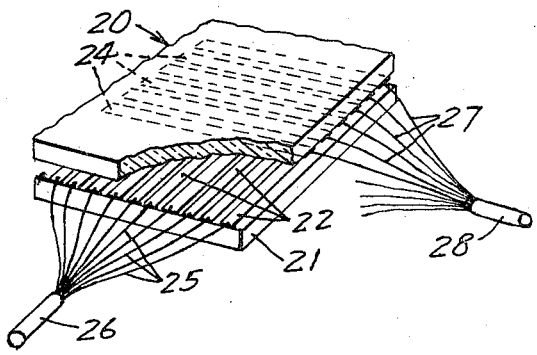
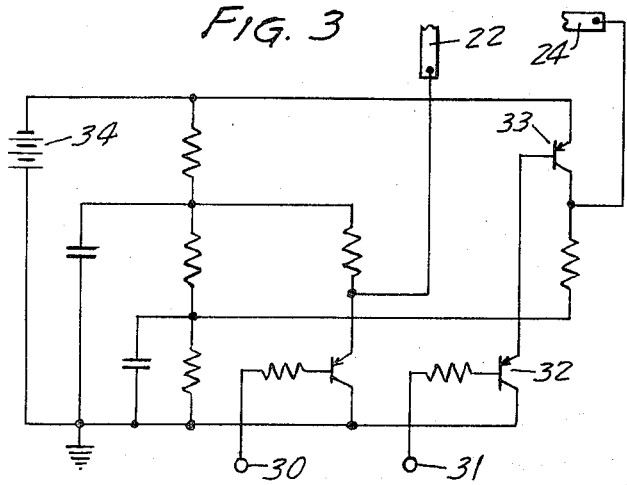
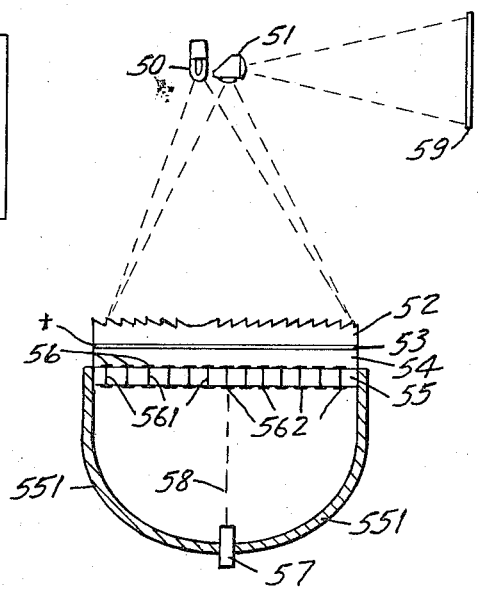
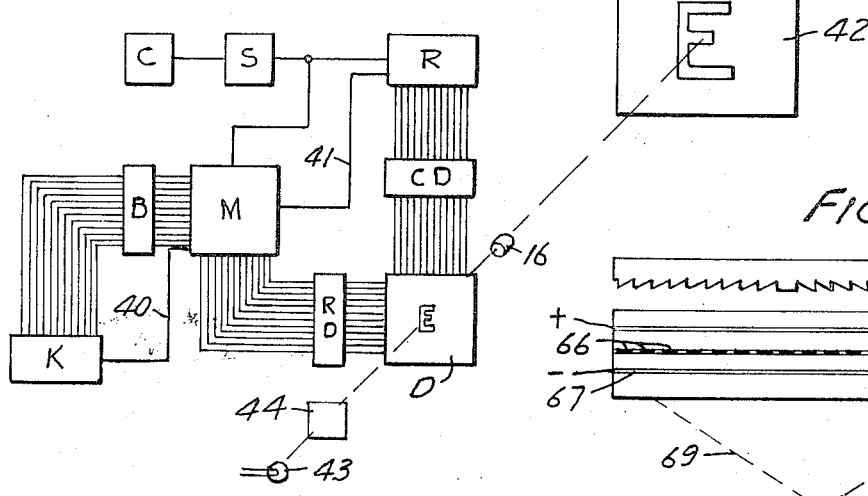
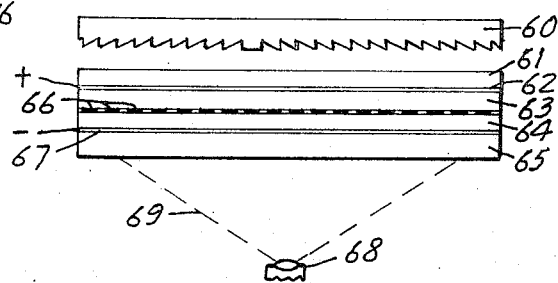

PROJECTOR

This invention relates to the projection of light-images, and in particular to projection apparatus for modulating and projecting a light beam in providing large area visual displays.

Electro-optical elements utilizing organic nematic liquid crystals have been described. For example, in U.S. Pat. No. 3,322,485 there is described a cell of two panels separated by a thin layer of liquid crystals. An x-y grid of conductive electrode strips makes possible the application of an energizing potential between the panels at selected pattern-defining bit areas. Both panels may be transparent, in which case the energized bit areas appear faintly darkened when viewed by transmitted light. Reversal of image and background may be achieved by use of reflected rather than transmitted light. Contrast may be increased, although at the expense of a reduction in brightness, by employing crossed polarizers, e.g., as disclosed in U.S. Pat. No. 3,499,702. Viewing area is limited by the size of the display panels and polarizers.

It has now been found possible to obtain increased viewing area and to improve both contrast and brightness of alphanumeric and other visual displays from liquid crystal electro-optical elements, by incorporating the electro-optical light-modulating panel in an optical projector as will now be further described in connection with the attached illustrative drawing, wherein:

FIG. 1 is a view in perspective of a presently preferred form of projector embodying the electro-optical panel, FIG. 2 is a detail partial view, in perspective and partly cut away, of one form of electro-optical element, FIGS. 3 and 4 are diagrammatic representations showing illustrative forms of control circuits for use with the element of FIG. 2, FIG. 5 is a schematic representation of another form of projector and control panel, and FIG. 6 is a schematic illustration of a further form of panel and modulating means.

As described in U.S. Pat. No. 3,511,563, the projector 10 of FIG. 1 comprises a case 11 containing a lamp and reflector assembly accessible through a door 12, a stage 15, including a Fresnel condensing lens, and a projection head or projection optic 16. In the present case the stage 15 further incorporates an electro-optical element 20 shown in more detail in FIG. 2, and located between the Fresnel lens and the projection optic.

The element 20 comprises a lower transparent panel 21 having an x-grid of parallel conductive strips 22 and an upper transparent panel 23 having a y-grid of parallel conductive strips 24, the two grids crossing each other as shown. The two panels are closely spaced, preferably by means of suitable non-conductive shims or spacers along their margins, and the space between the panels is filled with nematic organic liquid crystals, the spacers and filler being omitted from the drawing for clarity of illustration. Leads 25 make contact with the strips 22 and are assembled into wire-bundle 26; and leads 27 similarly make contact with strips 24 and form wire-bundle 28.

In a specific example the compound p-(N-(p-methoxybenzylidene-)amino)-n-butylbenzene, which is operative over a wide temperature range covering normal room temperature, serves as the liquid crystal material, the layer being one mil in thickness. An EMF of about 24 volts applied across a single x-strip 22 and y-strip 24 causes the normally clear crystal layer at the area common to the two strips to become cloudy and light-diffusing, and a dark image of that area appears on the otherwise brightly lighted projection screen on which the light beam is focused.

Scanning techniques permit sequential scanning of both x-strips and y-strips in repetitive manner to provide an above-threshold potential difference at each cross-point independently and at a speed appropriate to the image decay time of the liquid crystal layer. The scanning pattern may then be modulated to superimpose an image-forming sequence of voltage pulses for providing a constant-state or constantly changing projection image.

Clear glass panels coated with transparent conductive tin oxide or other material are useful in preparing the panels 21 and 23. The coating is removed by etching or in other ways, or the surface is initially masked to prevent retention of the coating, at the areas between strips; and panels having conductive strips and non-conductive spaces each only one or two mils in width are easily possible, although much greater widths provide structures useful for many less exacting purposes.

Maximum cloudiness of the crystal layer at the addressed bit area of the device as above described is obtained under a potential difference of about 50 volts; fully effective change occurs at about 24 volts; decreasing cloudiness is produced under lower voltages, down to a threshold voltage of about eight volts. Due to the conductivity of the liquid crystal layer, and particularly in a display containing large numbers of x and y strips, voltage differences sufficient to provide an undesirable background cloudiness may be derived from the impressed voltage at a number of cross-over points adjacent the point primarily addressed, and particularly along the single x and y strips defining such primary point. The driver circuit illustrated in FIG. 3 serves to reduce such background voltages to a value of one-third or less of the potential difference at the primary cross-over point and thus assists in providing sharply defined projection images of high contrast; thus, when operating at 24 volts the background is reduced to less than threshold voltage.

The circuit of FIG. 3 is activated by low-voltage impulses applied at x-contact 30 and y-contact 31 to provide full voltage impulses at x-strip 22 and y-strip 24. When such activating impulse is applied to but one of the input points, for example to contact 30, the opposed switching transistors, in this instance transistors 32, 33, remain open and the potential difference between strips 22 and 24 is suppressed to not more than one-third of the full voltage supplied by the source 34. Hence only a single cross-over point, identified by the x and y points 30 and 31, receives sufficient voltage to cause full cloudiness and to provide an area of maximum darkness on the projection screen.

Driver circuits as illustrated in FIG. 3 may be employed in the circuit of FIG. 4 which includes a keyboard K, buffers B, read-only memory M, clock C, pulse shaper S, shift register R, row driver RD, column driver CD, and liquid crystal display D, all connected as indicated. An "output enable" connection 40 between keyboard and memory, and a "reset strobe" connection 41 between shift register and memory, may be included if necessary. Activation of a single memory cell from keyboard K results in the sequential activation of display D to produce a projection transparency pattern, which is then projected on viewing screen 42 by means of light source 43, condensing lens 44, and projection optic 16 of projector 10, as shown for the enlarged and brightly illuminated letter E in FIG. 4.

In the form of projection apparatus shown in FIG. 1, the light source and projection optic are at opposite sides of the condensing lens and electro-optical element, both of which must therefore be normally transparent and non-light-diffusing. Another form, an example of which is described in U.S. Pat. No. 3,293,982, places both light source and projection optic closely together and at the same side of the lens, and relies on reflection of the incident light. This form may be used with the electro-optical element or display panel of FIG. 2 by employing a reflective condensing lens system as described in the patent. It may alternatively be used with a transparent condensing lens system and with novel alternative electro-optical elements and control systems as will now be further described.

The example of an alternative structure illustrated in FIG. 5 comprises a light source 50 and projection optic 51 mounted at one side of a transparent condensing lens 52, in this case a Fresnel lens having a flat lower surface in the position shown. The flat surface carries a transparent conductive coating 53. A thin liquid crystal stratum 54 separates the lens surface from a support 55 having on its upper surface a raster of small thin closely spaced metallic reflectors 56, to each of which is connected by connector 561 a metal terminal 562 at the opposite surface of the support 55 and enclosed within a vacuum chamber defined by the support 55 and walls 551. The chamber encloses an electron gun 57. The electron gun by means of known circuitry, not shown, scans the surface with an electron beam 58 which, when it impinges on a terminal 562, charges the corresponding reflector 56 to an operative potential difference with respect to the layer 53. The beam is suitably modulated to produce an informational pattern. The liquid crystal stratum is changed from transparent to light-diffusing above the charged reflectors but remains clear above the remaining reflectors. The resulting reflected light pattern is focused by projection optic 51 on the viewing screen 59 where it appears as dark informational areas on a brilliantly lighted background.

A further example, having additional advantages in terms of simplicity and as providing for the intensification or amplification of light-images, is illustrated in FIG. 6. A transparent Fresnel condensing lens 60 is positioned closely adjacent a transparent support 61 having a transparent conductive surface coating 62 in contact with a thin normally transparent liquid crystal stratum 63. The liquid crystal stratum is in further contact with, and supported on, the specularly reflective upper surfaces of a photoconductive layer 64, e.g., of zinc oxide in an insulating binder, supported on a transparent panel 65 having a transparent conductive coating 67 on the upper surface and in contact with the photoconductive layer. The specularly reflective surface is formed as a raster of small thin metallic deposits 66 separated by a web-like pattern of light-absorbing insulation.

A projector 68 focuses a light-image 69 on the lower surface of the photoconductive layer, causing the illuminated areas to become conductive and permitting the correspondingly positioned reflective segments 66 to become charged. The resulting conversion of the liquid crystal stratum from clear to light-diffusing above such segments produces a corresponding pattern of dark instructional areas on a bright background in the projection system described in connection with FIG. 5. By this system a low intensity light image from projector 68 may be converted to an image of greatly increased intensity at the viewing screen.

What is claimed is as follows:

1. A projection system comprising, in combination, light source means for providing a light beam, condenser means for condensing said beam and directing the condensed beam toward a projection optic, projection optic means for focusing said beam on a viewing screen, beam modulating means between said condenser means and said projection head and comprising an electro-optical element having a continuous thin liquid crystal stratum between a transparent upper plate having an x-array of parallel conductive strips contacting one surface of said stratum and a lower plate having a y-array of parallel conductive strips contacting the other surface of said stratum, and voltage supply means including scanning means for permitting impression of greater than threshold voltage consecutively at each juncture of said x-array and y-array, modulating means for restricting impression of said voltage at specified junctures, and suppressing means for restricting the voltage differential to less than threshold voltage at all but said each junctures.

2. System of claim 1 wherein said modulating and scanning means includes a keyboard for activating said system to produce a single desired projected image from a plurality of available image-producing signals, a buffer, a read-only memory, a clock, a pulse shaper, a shift register, a row driver, a column driver, an output enable connection between keyboard and memory, and a reset strobe connection between shift register and memory.

3. A projection system comprising, in combination, light source means for providing a light beam, condenser means for condensing said beam and directing the condensed beam toward a projection optic, projection optic means for focusing said beam on a viewing screen, beam modulating means between said condenser means and said projection head and comprising an electro-optical element having a continuous thin liquid crystal stratum between a transparent upper plate having at least one conductive surface area contacting one surface of said stratum and a lower plate having opposing conductive surface areas comprising a raster of small thin closely spaced metallic reflectors contacting the other surface of said stratum, and voltage supply means for supplying a voltage differential between selected opposing conductive surface areas of said plates and greater than the threshold voltage for said liquid crystals.

4. System of claim 3 wherein is included an electron gun for providing an electron beam capable of imparting a negative charge to any one of said reflectors, and control means for modulating said beam in accordance with a desired display and for causing said beam to scan successively all of said reflectors.

5. System of claim 3 wherein said reflectors are supported on a photoconductive subsurface.

6. System of claim 5 wherein is included means for impressing a light-image on said subsurface to render the thus exposed areas conductive, and means for establishing a potential difference between the reflectors at said conductive areas and the said upper plate conductive surface area.

* * * * *